(12) United States Patent
Lubbers

(10) Patent No.: US 9,884,585 B1  
(45) Date of Patent: Feb. 6, 2018

(54) EXTERIOR VEHICLE ALERTING SYSTEM

(71) Applicant: Faraday & Future Inc., Gardena, CA (US)

(72) Inventor: Matt Lubbers, Manhattan Beach, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/269,398

(22) Filed: Sep. 19, 2016

(51) Int. Cl.
   *B60Q 1/26* (2006.01)
   *B60Q 1/52* (2006.01)

(52) U.S. Cl.
   CPC .................................... *B60Q 1/525* (2013.01)

(58) Field of Classification Search
   CPC ........................................................ B60Q 1/525
   USPC ........................................................ 340/474
   See application file for complete search history.

(56) References Cited

U.S. PATENT DOCUMENTS

| | | | |
|---|---|---|---|
| 8,537,030 B2 | 9/2013 | Perkins | |
| 8,903,640 B2 | 12/2014 | Caminiti et al. | |
| 9,517,767 B1* | 12/2016 | Kentley | B60N 2/002 |
| 2011/0032122 A1* | 2/2011 | Hayashi | G08G 1/04 |
| | | | 340/943 |
| 2011/0199199 A1* | 8/2011 | Perkins | B60Q 1/506 |
| | | | 340/435 |
| 2012/0173068 A1* | 7/2012 | Seiter | B60T 7/22 |
| | | | 701/23 |
| 2015/0035685 A1 | 2/2015 | Strickland et al. | |
| 2016/0075332 A1* | 3/2016 | Edo-Ros | B60W 30/0956 |
| | | | 701/70 |
| 2016/0343256 A1* | 11/2016 | Song | G08G 1/005 |

* cited by examiner

*Primary Examiner* — Naomi Small  
(74) *Attorney, Agent, or Firm* — Finnegan, Henderson, Farabow, Garrett & Dunner LLP

(57) ABSTRACT

An exterior alerting system for a vehicle. The system may include a sensor, a controller, and an alerting device. The sensors maybe configured to detect an object exterior to the vehicle. Additionally, the controller may be configured to receive a position of the object from the sensor, calculate a danger zone based on a trajectory of the vehicle and the position of the object, and generate at least one exterior alerting signal when the vehicle cannot avoid the danger zone.

14 Claims, 7 Drawing Sheets

EXTERIOR VEHICLE ALERTING SYSTEM

DESCRIPTION

Technical Field

The present disclosure relates generally to vehicle alerting systems, and more particularly, to systems and methods for automatically changing vehicle trajectory and generating exterior alert signal to avoid collisions.

BACKGROUND

Electronic sensors can be used by vehicles to prevent collisions. The utilization of automatic methods that generate signals greatly improve the response time, help the driver to avoid collisions, and reduce accident probability. For example, if a proximity sensor outside a vehicle detects that an object is close to a vehicle, a system may alert the driver and, in some situations, may automatically deaccelerate the vehicle to avert a probable impact.

Although conventional methods may be suitable for some applications, they are still less than optimal. For example, conventional methods may have a limited ability to avoid collisions because they may be only capable of modifying the trajectory of the vehicle or alerting the driver. In multiple instances, given the momentum of the vehicle and range of direction change, only alerting the driver or modifying the trajectory of the vehicle may not always prevent a collision with an obstacle or object. Hence, there are certain scenarios in which by the time exterior sensors detect objects in the trajectory of the vehicle, the collision may be unavoidable.

The disclosed exterior alerting system of the present disclosure is directed to mitigating or solving the above described and/or other problems in the art.

SUMMARY

One aspect of the present disclosure is directed to an exterior alerting system for a vehicle. The system may include a sensor, a controller, and an alerting device. The sensors may be configured to detect an object exterior to the vehicle. Additionally, the controller may be configured to receive a position of the object from the sensor, calculate a danger zone based on a trajectory of the vehicle and the position of the object, and generate at least one exterior alerting signal when the vehicle cannot avoid the danger zone.

Another aspect of the present disclosure is directed to a method for generating exterior alerting signals from a vehicle. The method may include receiving a position of an object exterior to the vehicle from a sensor, calculating a danger zone based on a trajectory of the vehicle and the position of the object, and generating at least one exterior alerting signal when the vehicle cannot avoid the danger zone.

Yet another aspect of the present disclosure is directed to a non-transitory computer-readable storage medium storing a computer program which, when executed by at least one processor, causes the at least one processor to perform a method for generating exterior alerting signals from a vehicle. The method may include receiving a position of an object exterior to the vehicle from a sensor, calculating a danger zone based on a trajectory of the vehicle and the position of the object, generating at least one exterior alerting signal when the vehicle cannot avoid the danger zone, and providing an alert to the object based on the exterior alerting signal.

DETAILED DESCRIPTION

The disclosed exterior alerting system may generate warning signals to prevent collisions with objects exterior to a vehicle. The exterior alerting signals may complement internal alerts directed to the driver and automated vehicle trajectory changes. Additionally, the alerting system may monitor exterior objects response to an alerting signal and dynamically change driver alerts or the trajectory of the vehicle accordingly. The alerting system may use information that is communicated to a controller from sensors such as cameras, radars, and LIDARs, setup to detect and monitor exterior objects. The alerting system may also utilize sensor information to estimate exterior objects position and calculate a related danger zone. The calculation of a danger zone may be based on velocities, distances, driving conditions, or other predefined parameters and rules. In some embodiments, the system may generate the exterior alerting signal with a horn, a light, an exterior display, an alarm, and/or a speaker. The exterior alerting signal niay also indicate a safe direction and may increase signal frequency and/or signal intensity based on the sensed distance between the vehicle and exterior objects. In additional embodiments, the exterior altering system may be connected to a network and transmit the alerting signal to exterior objects or other controllers (e.g., controllers in other vehicles).

Figure 1:
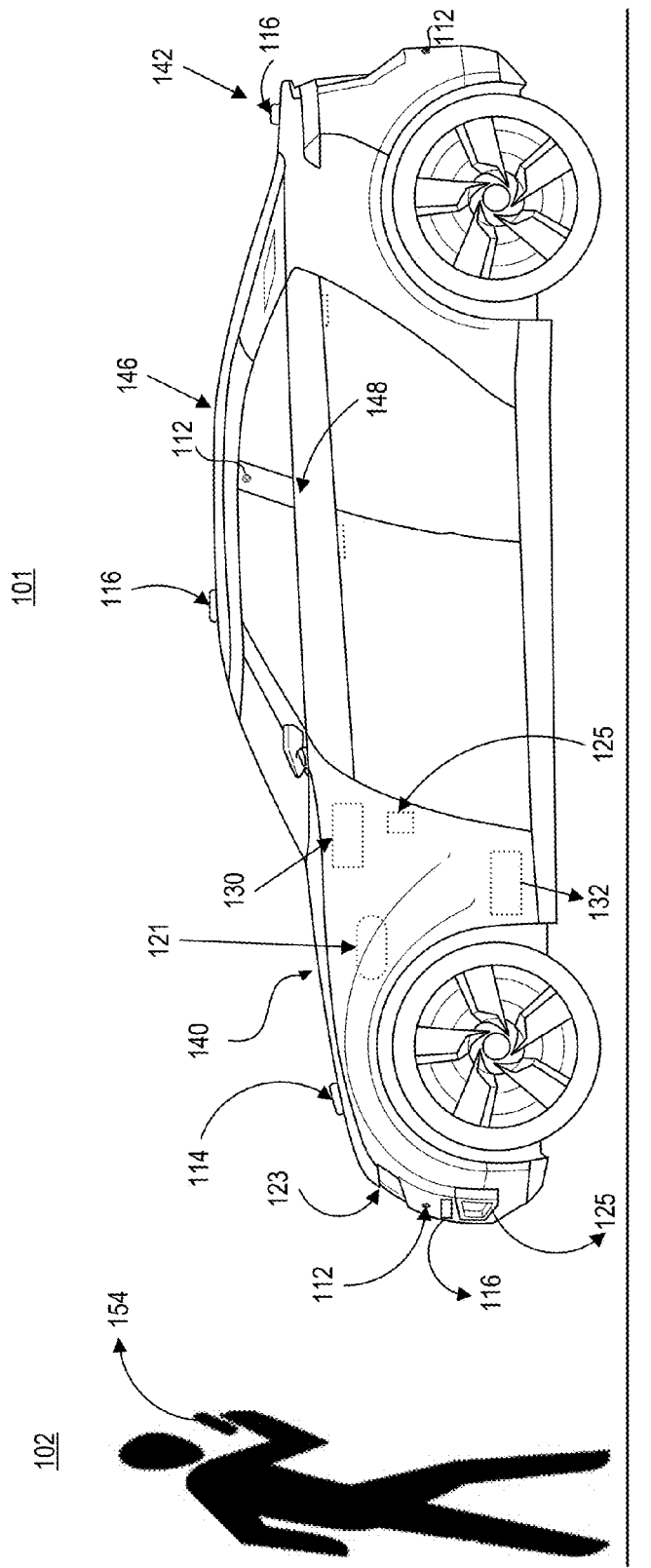
FIG. 1 is a diagrammatic illustration of an exemplary vehicle according to a disclosed embodiment.

FIG. 1 provides a diagrammatic illustration of the exterior of an exemplary vehicle 101. Vehicle 101 may be configured to be operated by a driver occupying vehicle 101, to be remotely controlled, and/or to be autonomously controlled. Vehicle 101 may further include a plurality of seats to accommodate occupants of vehicle 101. As illustrated in FIG. 1, vehicle 101 may include a frame having a front end 140, a rear end 142, a ceiling 146, and a plurality of pillars 148 on each side.

Vehicle 101 may include exterior sensors such as cameras 112, ultrasonic transducers 114, and/or electromagnetic surveying devices such as radars and/or LIDARs 116. Vehicle 101 may additionally include alerting devices such as horns and/or alarms 121, lights and/or exterior displays 123, and speakers 125. Vehicle 101 may further include positioning devices such as GPS receiver 132, connected to controller 130. Exterior sensors, positioning devices, and alerting devices may be embedded on vehicle 101 or attached to panels with, for example, bolts and fasteners.

Cameras 112, ultrasonic transducers 114, and electromagnetic surveying devices 116 may be configured to detect an object 102 exterior to vehicle 101. Object 102 may be, for example, a pedestrian or another vehicle. Object 102 may have a connected device 152 that may be in communication with controller 130 through a network. In some embodiments connected device 152 may include a cell phone, a smartphone, a wearable device, a second vehicle controller, and/or a radio.

Figure 2:
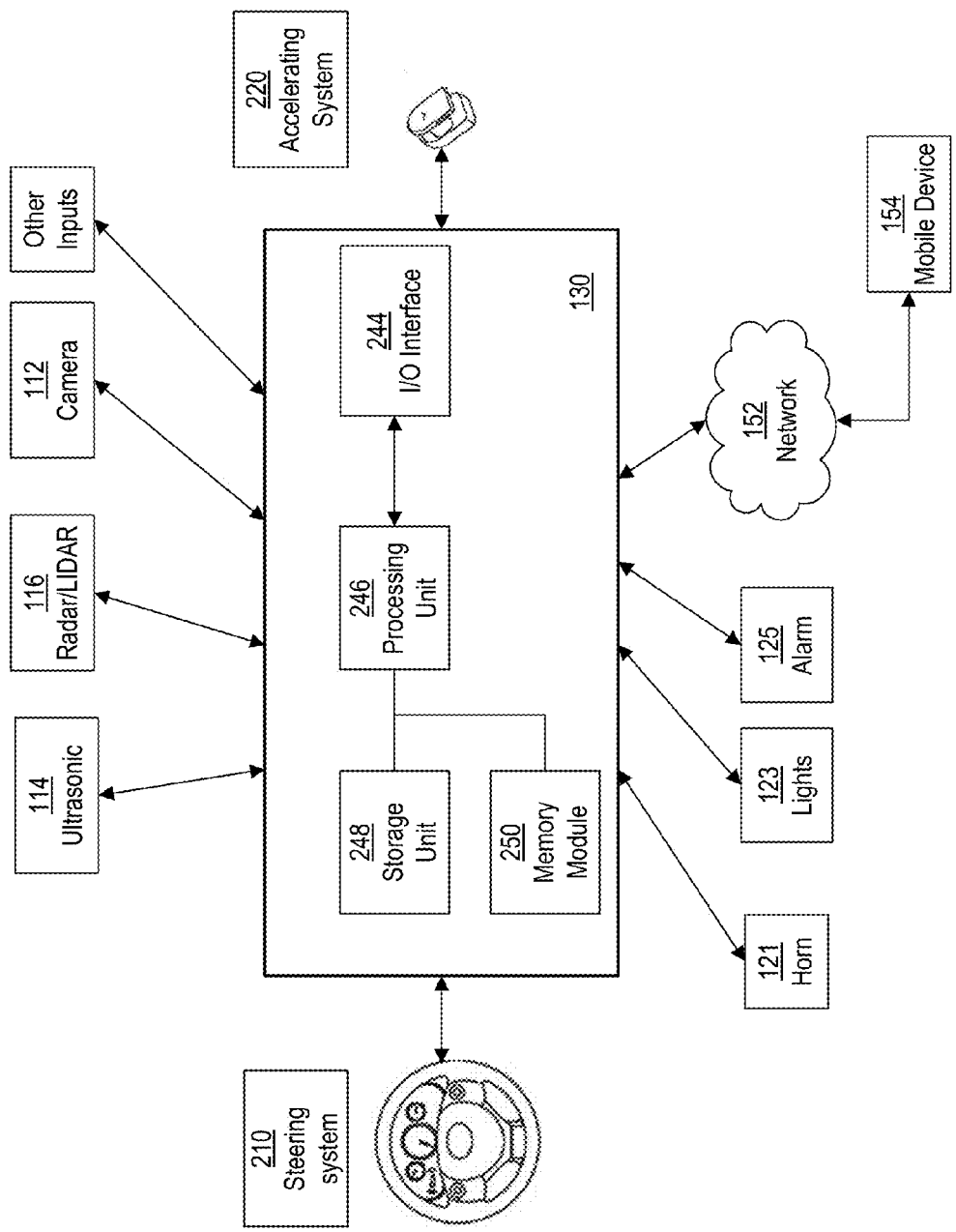
FIG. 2 is a block diagram illustrating an exemplary network including an exterior alerting system, according to a disclosed embodiment.

Controller 130 is illustrated in greater detail in FIG. 2, which provides a block diagram, including controller 130, that may be used with an exemplary system for detecting an object 102 based on information received from exterior sensors. Upon detection of exterior objects, controller 130 may generate signals and/or instructions for alerting devices, steering mechanisms 210, and/or acceleration system 220 of vehicle 101. Controller 130 may include I/O interface 244, processing unit 246, storage unit 248 and memory module 250. Controller 130 may have different modules in a single device, such as a processor or FPGA, or separated devices with dedicated functions.

I/O interface 244 may send data to and receive data from components such as cameras 112, surveying devices 116, ultrasonic transducers 114, and controller 130 via communication cables, wireless networks such as radio waves, a nationwide cellular network, and/or a local wireless network (e.g., Bluetooth™ or WiFi), or other communication methods.

Controller 130 may include processing unit 246, which may be configured to generate and transmit command signals via I/O interface 244. Processing unit 246 may be configured to detect the presence of an exterior object based on information received from cameras 112, surveying devices 116, and/or ultrasonic transducers 114. Processing unit 246 may also be configured to estimate the position of object 102 and calculate a danger zone based on the received information from sensors, such as velocities of vehicle 101 and object 102, driving conditions, and/or other parameters stored in storage unit 248 or memory module 250. Processing unit 246 may also be used to generate alerting signals at a specific frequency, intensity, and/or direction.

Processing unit 246 may also receive input from other components in vehicle 101, and from other sources. As shown in FIG. 2, controller 130 may be configured to receive data from multiple sources including cameras 112, electromagnetic surveying devices 116, and/or ultrasonic transducers 114, connected device 152, and other inputs in vehicle 101, such as speakers 125 and microphones. Controller 130 may also be configured to receive vehicle location data, from positioning devices such as GPS or cellular networks, and using location methods such as image recognition.

Processing unit 246 may also be connected with wired or wireless methods to vehicle alerting devices such as horns and/or alarms 121, lights and/or exterior displays 123, and/or speakers 125. Processing unit 246 may be able to trigger an alarm signal, specify its frequency, and/or generate a message to be provided as part of the alert. In some exemplary embodiments, processing unit 246 may create master-slave hierarchies with microcontrollers of alarm devices to set the alarm signals.

Controller 130 may also include storage unit 248 and/or memory module 250, which may be configured to store one or more computer programs that may be executed by processing unit 246 to perform functions. For example, storage unit 248 and/or memory module 250 may be configured to store algorithms to estimate the position of a detected object. Storage unit 248 and/or memory module 250 may also be configured to store computer functions to calculate danger zones around detected objects based on defined rules. Storage unit 248 and/or memory module 250 may additionally, or alternatively, store computer programs to modify the trajectory of vehicle 101. For example, storage unit 248 and/or memory module 250 may be configured to store parameters pertaining to trajectory changes or vehicle capabilities. Storage unit 248 and/or memory module 250 may also store software related to shape recognition or distance estimation.

One or more components of controller 130 may be located in vehicle 101, as shown, or may be alternatively in a mobile device, in the cloud, or another remote location. Components of controller 130 may be in an integrated device, or distributed at different locations but communicate with each other through network. For example, processing unit 246 may be a processor on-board vehicle 101, a processor inside a mobile device, or a cloud processor, or any combinations thereof.

Figure 3:
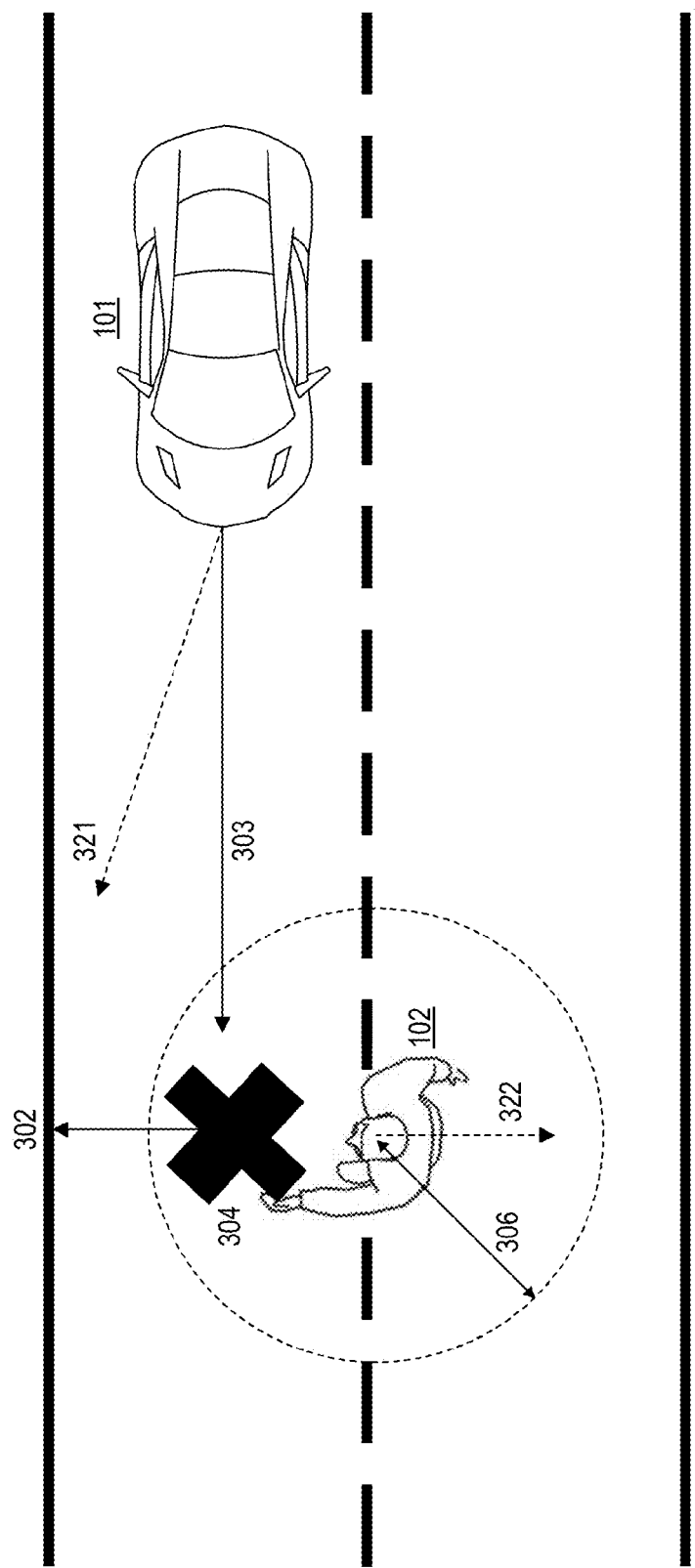
FIG. 3 is a top view diagrammatic illustration of an exemplary vehicle, and an exterior object.

FIG. 3 is a schematic illustration of vehicle 101 and an object 102, e.g., a pedestrian, on a roadway. In one embodiment, controller 130 may retrieve vehicle 101 velocity vector 303 based on real measurements and estimate object 102 velocity vector 302 based on, for example, information from cameras 112, surveying devices 116, and/or ultrasonic transducers 114. Controller 130 may further estimate a collision point 304 based on velocities and positions of vehicle 101 and object 102, and calculate a danger distance 306. Controller 130 may further determine danger zone 308 based on the position of object 102 and calculated danger distance 306. Collision point 304 may be a specific coordinate, such as the ones utilized for geolocation, a portion of a two-dimension image, or a point in the horizon of the vehicle 101.

FIG. 3 shows danger zone 308 as a circular area with a radius of calculated danger distance 306. However, other type of areas and distances, such as polygons, may be determined by controller 130, which utilizes danger distance 306 as a parameter for the polygon formation.

FIG. 3 also presents safe direction vectors, represented with doted lines in the illustration, which may be calculated by controller 130. A safe direction vector may indicate a moving direction for vehicle 101 and/or object 102 that may minimize probability of collision by, for example, directing vehicle 101 and object 102 in opposite directions. Controller 130 may compute safe direction vectors upon the estimation of a collision point 304 with object 102. Controller 130 may calculate a safe direction for object 102 based on, for example, the closest distance to leave danger zone 308 and/or velocity vectors 302 and 303. In some embodiments, controller 130 may determine that a change in the traveling direction of object 102 will place it outside danger zone 308. Controller 130 then may calculate safe direction vector 322 for object 102 that is in an opposite direction to velocity vector 302. In some embodiments, controller 130 may also calculate safe direction vector 321 for vehicle 101. Safe direction vectors 321 and 322 may be substantially in opposite directions, so that vehicle 101 and object 102 may move towards opposite directions and thus maximize their distance. For example, if object 102 is approaching collision point 304 from the left of vehicle 101, controller 130 may generate safe direction vector 322 for object 102 to head towards a direction opposite to the traveling direction of object 102. Additionally, controller 130 may generate safe direction vector 321 for vehicle 101 to go to the right.

Controller 130 may provide alerts by activating lights or displays 123, horns and alarms 121, and/or speakers 125. For example, a warning signal may be provided by turning on lights 123, actuating horns 121, and/or transmitting a message through speakers 125. Additionally, or alternatively, controller 130 may provide instructions to generate warning signals based on safe direction vector 322. For example, in some embodiments, controller 130 may provide a message transmitted through speakers 125, which may indicate a safe direction for object 102. In other embodiments, controller 130 may instruct display 123 to show an arrow based on safe direction vector 322.

Figure 4:
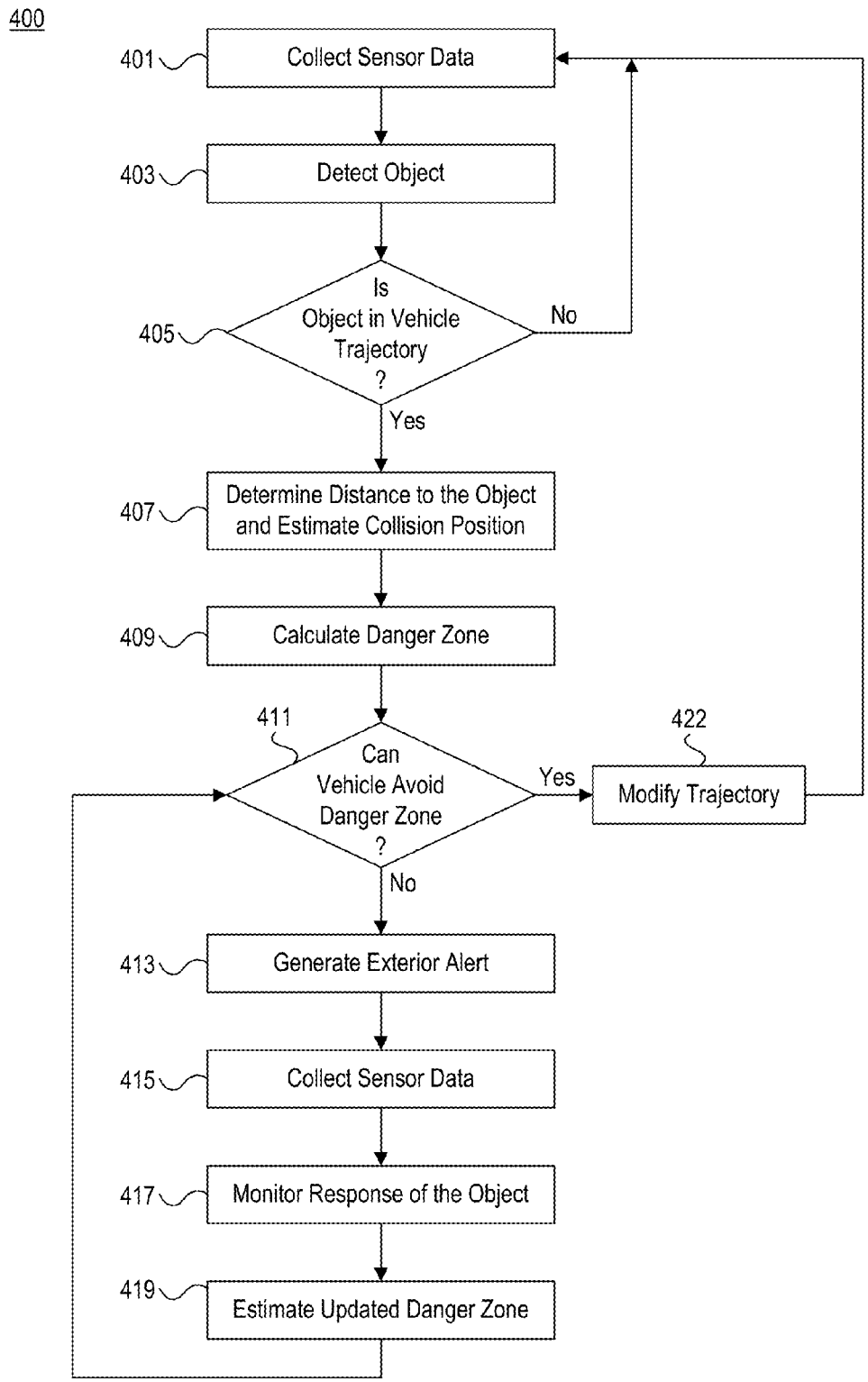
FIG. 4 is a flowchart of an exemplary process for generating and providing exterior alerts to avoid collisions.

FIG. 4 is a flowchart of an exemplary process 400 for generating exterior alerts and providing an automated response to avoid collisions. In step 401, sensors, such as cameras 112, ultrasonic transducers 114, and/or electromagnetic surveying devices 116, may he triggered to capture images and other information about the exterior of vehicle 101. The data, such as 2D, 3D images, coded maps, or multi-dimensional matrixes of the scene, may be then transmitted to controller 130 through wired or wireless networks. Controller 130 may, continually or intermittently, request the exterior image from sensors based on defined rules stored in the storage unit 248 or memory module 250.

In Step 403, controller 130 may detect the presence of object 102. Controller 130 may aggregate information from multiple sensors to detect and recognize object 102. In some embodiments the captured exterior image or data may be processed using data processing techniques, such as image recognition algorithms, that correlate the captured data with information in storage unit 248. Controller 130 may identify the type of detected object and classify it. For example, controller 130 may determine if object 102 is a traffic sign, a pedestrian, a tree, an animal, or another vehicle.

In Step 405, controller 130 may determine if object 102 is in the trajectory of vehicle 101. Based on velocity vectors 302 and 303, controller 130 may estimate whether the object 102 may be in the trajectory of vehicle 101. The routines in step 405 may be designed to minimize computing expense and quickly make the determination based on rules or processes stored in storage unit 248 or memory module 250, such as look-up tables. For example, controller 130 may determine that object 102 is in the trajectory of vehicle 101 if it is detected with any sensor positioned in front end 140 and/or if object 102 is determined to be moving towards vehicle 101. Alternatively, controller 130 may determine object 102 is in the trajectory of vehicle 101, when object 102 is unexpected in the roadway. For example, standard roadway elements such as trees or traffic signals can be quickly determined not to be in the trajectory of vehicle 101, but pedestrians can be immediately identified as potential objects in the trajectory of vehicle 101.

When controller 130 determines that there is no object in the trajectory of vehicle 101 (step 405: no), it may go back to step 401 and continue collecting exterior sensor information. However, if it is determined that there is an object 102 in the trajectory of vehicle 101 (step 405: yes), then controller 130 will proceed to perform step 407.

In Step 407, controller 130 may aggregate sensor data to determine the position of object 102 and the distance between vehicle 101 and object 102. In some embodiments, data from sensors in different locations in vehicle 101 maybe used to triangulate the position of object 102 utilizing algorithms stored in storage unit 248. For example, cameras 112 in two or more parts of the vehicle may capture an image of object 102. Controller 130 may utilize image recognition software to identify a specific point of object 102, for example the pedestrian's head, and utilize stereo triangulation to determine the distance between vehicle 101 and object 102. The stereo triangulation may include the determination of a base distance between cameras 'b', a focal length 'f' of both cameras, and in line dimension 'x1' and 'x2'. Then, (X,Y,Z) coordinates for object 102 may be calculated based on $Z=(b*f)/(x1-x2)$; $X=x1*Z/f$ $Y=y1*Z/f$. In other embodiments, controller 130 may have microcontrollers or time measuring devices to calculate time lapses between the emission and reception of ultrasonic and/or electromagnetic waves. For example, controller 130 may trigger the emission of an ultrasonic wave by ultrasonic transducers 114, start a timer, and receive reflected waves to estimate distance based on the Doppler Effect or estimation of wave traveling time. In yet further embodiments, the position and distance of object 102 may be estimated based on software that determines if object 102 is focused and if so, correlate focal distance of cameras 112 with distance of object 102. For example, object 102 may be imaged with multiple cameras, each with a different focal distance. Controller 130 may determine the best focused image and may estimate distance to object 102 and its position based on the focal distance of selected camera 112. The previously described embodiments to carry out step 407 may be used individually or in any combination.

In Step 409, controller 130 may estimate collision point 304 and related danger zone 306. Based on velocity vectors 302 and 303, and the position of object 102, controller 130 may project trajectories and calculate estimated collision point 304. Controller 130 may then estimate danger distance 306 and related danger zone 308. Danger distance 306 may he a fixed distance, for example 3 ft. However, danger distance 306 may also be based on exterior sensor data or rules stored in storage unit 248 or memory module 250. For example, rules for determination of safe distance may factor in weather conditions and/or velocity vector 303. In conditions with poor visibility or wet roads, detected by cameras 112 or other exterior sensors, danger distance 306 may have a multiplier. Similarly, danger distance 306 may be proportional to velocity vector 303 or the vehicle acceleration. Danger zone 308 may then be calculated based on the determined danger distance 306. Danger zone 308 may be defined as an area within danger distance 306 of the position of object 102. Alternatively, danger zone 308 may be an area surrounding collision point 304 or other reference point. Any suitable shape, such as round, rectangular, square, oval, etc., is contemplated In step 411, controller 130 may determine whether vehicle 101 is capable of avoiding calculated danger zone 308 based on the current speed, range of direction change, and/or vehicle acceleration. In some embodiments, controller 130 may correlate the sensed information, calculated positions, and estimated velocities with programmed cases stored in memory module 250 or storage unit 248. Storage unit 248 may contain a table of scenarios with different ranges for velocities and have a predefined instruction set. For example, storage unit 248 may include a table, which may indicate that a vehicle moving between 50 and 60 mph can only avoid a danger zone that is 150 ft, ahead or further away. Alternatively, controller 130 may perform algorithms in which it determines the minimum change in relative velocity and/or minimum direction change to avoid danger zone 308. In some embodiments controller 130 may perform process 600 (described below with respect to FIG. 6) to determinate whether vehicle 101 can avoid danger zone 308.

When it is determined that vehicle 101 can avoid danger zone 308 in step 411 (step 411: yes), controller 130 may perform step 422 to modify the trajectory and/or alert the driver. In step 422, controller 130 may apply an emergency break, reduce speed, or change the direction of vehicle 101. In some embodiments, controller 130 may override instructions from the driver to steering system 210 and may change the direction of vehicle 101 in safe direction vector 321. In other embodiments, controller 130 may actuate the acceleration system 220 to stop vehicle 101 or change the velocity of vehicle 101. In yet other embodiments the driver may be alerted of object 102 and may be provided instructions such as 'Stop', 'Accelerate', 'Move Left,' or 'Move Right'.

When it is determined that vehicle 101 cannot avoid danger zone 308 in step 411, controller 130 may perform step 413 and may trigger the generation of exterior alerts. For example, controller 130 may activate lights or displays 123, trigger horns and alarms 121, and/or broadcast a message through speakers 125. Controller 130 may then query and aggregate exterior sensor information in step 415 to monitor a response from object 102 in step 417. Controller 130 may determine the new position of object 102 and/or determine a new velocity vector 302 based on sensor information. For example, object 102 may stop, speed up, slow down, or change direction, in response to the alerts. Based on the response of object 102, controller 130 may recalculate danger distance 306, danger zone 308, and estimated collision point 304 in step 419. With the determination of updated danger zone 308, controller 130 may repeat step 409 to determine whether vehicle 101 can avoid danger zone 308 and modify the trajectory or generate a new exterior alert according to the determination.

Figure 5:
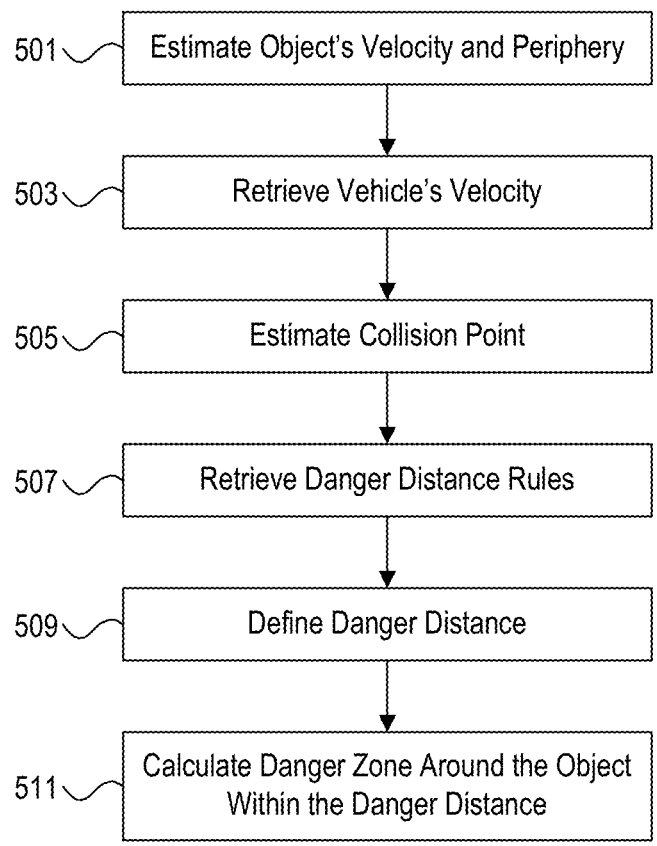
FIG. 5 is a flowchart of an exemplary process to calculate a danger zone for a detected object.

FIG. 5 is a flow chart that further describes step 409 of process 400 to calculate collision position 304 and danger zone 308 for object 102. In step 501, controller 130 may determine the velocity and periphery of the object 102. In some embodiments, two position determinations, as described for step 407, may be performed and distance between positions and lapsed time may be utilized to determine the velocity of object 102. For example, controller 130 may determine a position every 0.1 s and calculate velocity based on position differentials. Additionally, or alternatively, frequency modulation of captured electromagnetic or ultrasound waves may be correlated to the velocity of object 102. The periphery of object 102 may also he determined in step 501. Image recognition processes may be employed on the captured exterior data to establish the periphery of object 102 and establish, for example, the closest point to collision or an estimated center of mass. For example, a periphery of an object may be based on maximum of pixel intensity derivative and the center of mass may be defined in the middle of the defined periphery.

In step 503, controller 130 may retrieve the velocity of vehicle 101. I/O interface 244 in controller 130 may be in communication with the computers, instruments, or dashboard microcontrollers of vehicle 101. Controller 130 may retrieve the velocity and steering direction of vehicle 101, and calculate a vector base on the two.

Based on current positions of vehicle 101 and object 102, and velocity vectors 302 and 303, controller 130 may project trajectories and estimate collision point 304, where trajectories intercept, in step 505. In some embodiments, the trajectory estimation may be based on straight projection of vectors sustaining the current direction. In other embodiments, collision point 304 may be determined based on projective geometry for vectors and their interaction with the landscape. For example, if the road has potholes that may modify the trajectory of vehicle 101, controller 130 may project the trajectory of vehicle 101 and calculate collision point 304 based on the modified trajectory. In yet other embodiments, the projection of trajectories may be based on regions with, for example, Gaussian probabilities of the future location of vehicle 101 and object 102. Then, controller 130 may create probabilities of position and then generate a collision position based on a probability of interception above certain threshold. For example, controller 130 may project the trajectory by observing road patterns and creating a normal distribution curve with a mean in the current direction and a standard deviation dependent on road relief and/or velocity. Controller 130 may then generate a probability map and correlate it with collision point 304 by, for example, defining a collision point when the probability of collision is above 50%.

In step 507, controller 130 may query memory module 250 and storage unit 248 to retrieve rules for calculating danger distance 306. These rules may include equations, policies, and/or factors that are used to determine danger distance 306. For example, memory module 250 may include rules indicating that danger distance 306 should be established between 3 and 15 ft. Memory module 250 may also include rules indicating that danger distance is proportional to vehicle velocity vector 303 or the probability of collision. Controller 130 may input the sensed data, estimated positions, and velocity vectors 302 and 303 to define danger distance 306 in step 509. Controller 130 may be then utilize danger distance 306 to calculate danger zone 308 around object 102 as, for example, a circular area or a polygon shape in step 511.

Figure 6:
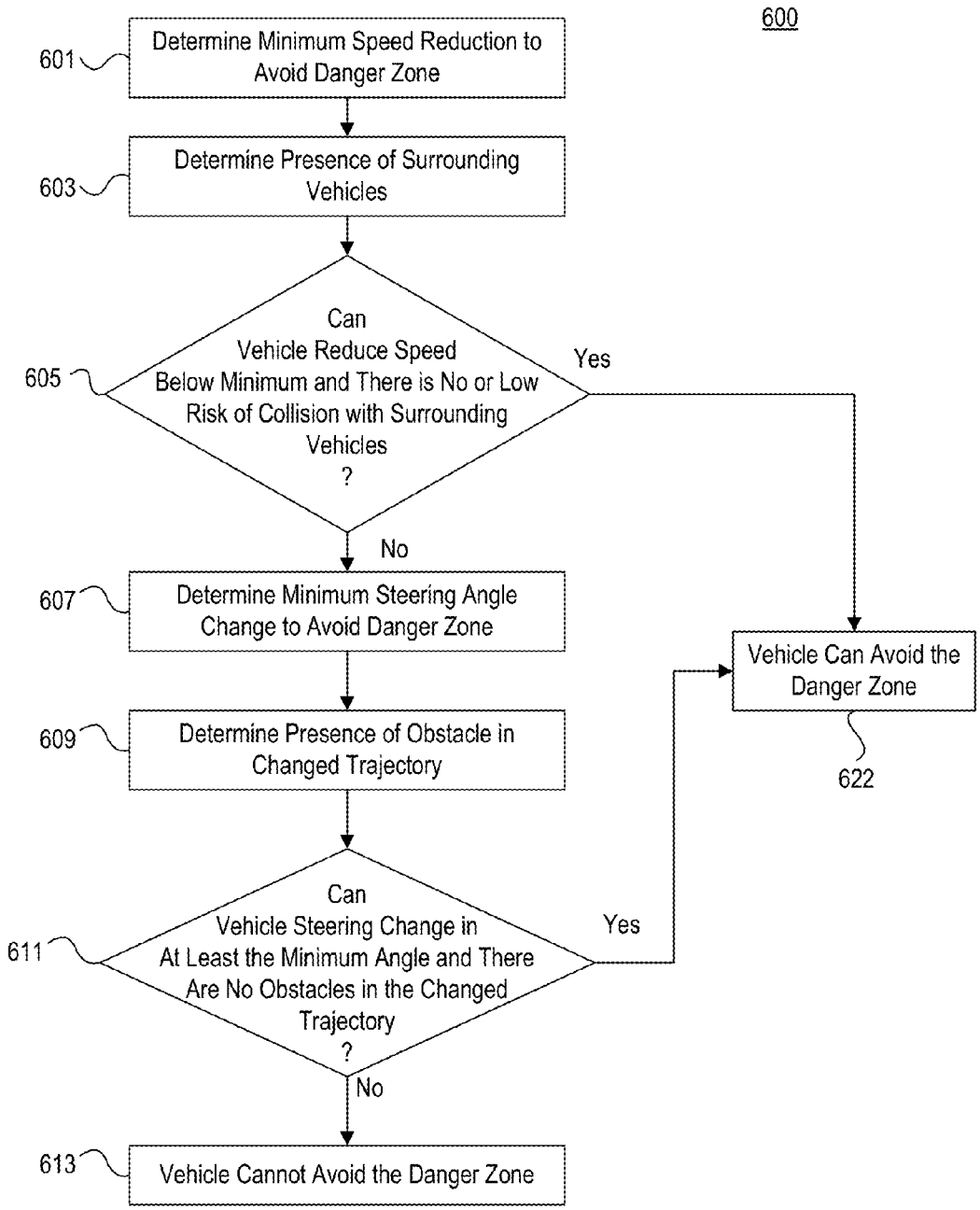
FIG. 6 is a flowchart of an exemplary process to determine if a vehicle can avoid a danger zone.

FIG. 6 is a flow chart that further describes the determination if vehicle 101 can avoid danger zone 308 as an exemplary embodiment of step 411. Upon the determination of danger zone 308, controller 130 may calculate a minimum speed reduction that is required to avoid danger zone 308 in step 601. The determination of the speed reduction may be based on the momentum of vehicle 101, road topography, deaccelerating capacity, and/or road conditions. Controller 130 may then query cameras 112, electromagnetic surveying devices 116, and/or ultrasonic transducers 114 in step 603, to determine whether there are other surrounding objects (such as vehicles following vehicle 101, or in the adjacent lane) and also to estimate their ability to prevent collision with vehicle 101 if the speed is to be reduced. For example, in the step 605, controller 130 may take into consideration that there is a truck in the back of vehicle 101, when controller 130 determines if vehicle 101 can reduce speed below the minimum determined speed to avoid danger zone 308. If controller 130 determines that it is possible to reduce speed below the estimated minimum and there is no or low risk of collision with surrounding objects (step 605:yes), then it would proceed to step 622. Controller 130 may then determine that the vehicle can avoid danger zone 308. However, if controller 130 determines that either condition is not met (step 605: no), then it continues to step 607.

In step 607 of process 600, controller 130 may determine a minimum steering angle change required to avoid danger zone 308. This determination may be based on the distance between vehicle 101 and object 102, velocity vectors 302 and 303, and road conditions. The minimum steering angle may be calculated to steer vehicle 101 into an area outside danger zone 308 or an area with low probability of collision. Additionally, in step 609, controller 130 may determine the presence of obstacles in the trajectory defined by the minimum steering angle change. For example, controller 130 may capture data from cameras 112 and determine that other vehicles are present in the trajectory defined by the minimum steering angle change. In step 611, controller 130 may determine if the minimum steering angle can be achieved in vehicle 101 and also if there are no obstacles in the proposed new trajectory. If both conditions are met (step 611: yes), then controller 130 may determine that vehicle 101 can avoid danger zone 308 and perform trajectory modification of step 422. However, if either condition is not met (step 611: no), then controller 130 may determine that danger zone 308 cannot be avoided in step 613, and then may proceed with the generation of exterior alerts as described in 413.

Figure 7:
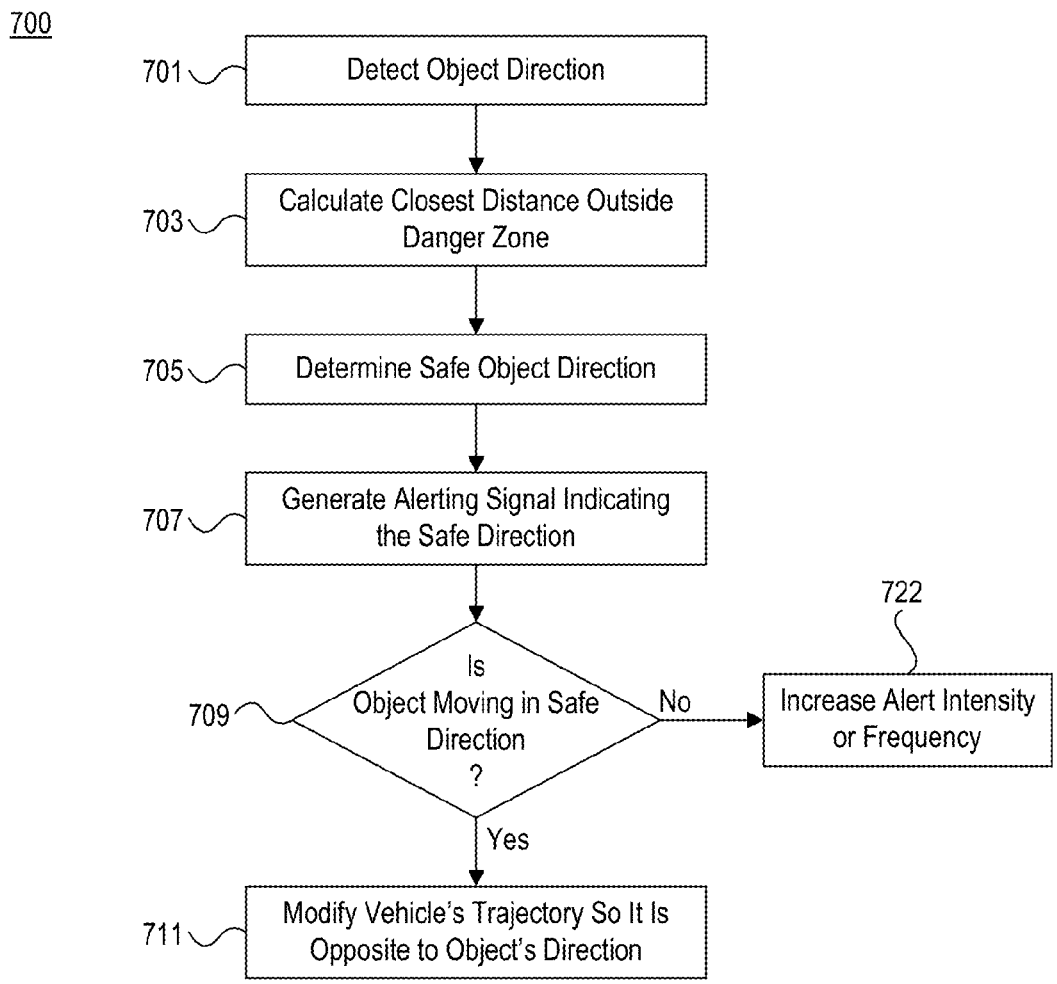
FIG. 7 is a flowchart of an exemplary process to generate alerting signals with an instructed moving direction.

FIG. 7 is a flow chart that describes an embodiment where the alerting signals may indicate safe directions and repeat with increased intensity and/or as the distance between vehicle 101 and object 102 reduces. In step 601, controller 130 will detect the velocity vector 302 of object 102 with, for example, the techniques described in step 501. Controller 130 may then calculate the closest distance outside danger zone 308 (step 703) and determine a safe direction vector 322 to leave danger zone 308 (step 705). For example, controller 130 may determine the shortest distance outside danger zone 308 and determine a safe direction accordingly. In step 707, controller 130 may generate an alerting signal to indicate safe direction vector 322. For example, controller 130 may instruct speakers 125 to broadcast a direction relative to the pedestrian according to safe direction vector 322. In some embodiments, speaker system 125 may broadcast "Move Left," or "Move Right". In other embodiments, controller 130 may instruct display 123 to flash lights in one side of vehicle 101, or show direction images such as arrows. Controller 130 may then retrieve information from the exterior sensors and determine if object 102 has moved according to safe direction vector 322 in step 709. After an affirmative determination that object 102 moved in a safe direction (step 709: yes), in step 711, controller 130 may modify the trajectory of vehicle 101 with routines described, for example, in step 422. In some embodiments, controller 130 may modify the trajectory of vehicle 101 according to safe direction vector 321 which may be opposite to safe direction vector 322. If object 102 does not move along safe direction 322 as instructed (step 709: no), controller 130 may perform step 722, in which controller 130 may generate an alert signal with higher intensity and/or frequency. Controller 130 then may repeat the alerting process to urge object 102 to move away from danger zone 308. In some embodiments, the sound intensity of horns and alarms 121 and speakers 125 may increase by a defined number of decibels every time step 722 is performed. In other embodiments, the intervals between the beeps may increase, and/or the pitch may be higher every time step 722 is performed. In yet other embodiments, the intensity of lights or displays may be increased and patterns may be modified every time step 722 is performed.

Another aspect of the disclosure is directed to a non-transitory computer-readable medium computer-readable medium storing instructions which, when executed, cause one or more processors to perform the methods, as discussed herein. The computer-readable medium may include volatile or non-volatile, magnetic, semiconductor, tape, optical, removable, non-removable, or other types of computer-readable medium or computer-readable storage devices. For example, the computer-readable medium may be the storage unit 248 having the computer instructions stored thereon, as disclosed. In some embodiments, the computer-readable medium may be a disc or a flash drive having the computer instructions stored thereon.

It will be apparent to those skilled in the art that various modifications and variations may be made to the disclosed interior color control system. Other embodiments will be apparent to those skilled in the art from consideration of the specification and practice of the disclosed interior color control system. It is intended that the specification and examples be considered as exemplary only, with a true scope being indicated by the following claims and their equivalents.

What is claimed is:

1. An exterior alerting system for a vehicle, comprising at least:
a sensor configured to detect an object exterior to the vehicle;
a controller configured to:
receive a position of the object from the sensor;
calculate a danger zone based on a trajectory of the vehicle and the position of the object, wherein the danger zone is determined as an area within a threshold distance from the position of the object;
calculate a potential vehicle trajectory different from the trajectory of the vehicle, the potential vehicle trajectory including a potential vehicle velocity vector;
calculate a potential danger zone different from the danger zone based on a trajectory of the object;
in the event that the potential vehicle trajectory intersects with the potential danger zone:
calculate a potential object velocity vector, wherein the potential object velocity vector is opposite the potential vehicle velocity vector,
generate at least one exterior alerting signal indicating an instruction to the object to move in the direction of the potential object velocity vector, and
modify the trajectory of the vehicle to be the potential vehicle trajectory; and
an alerting device configured to provide an alert to the object based on the exterior alerting signal.

2. The exterior alerting system of claim 1, wherein the sensor includes at least one of a radar, a LIDAR, a camera, and an ultrasonic transducer.

3. The exterior alerting system of claim 1, wherein the alerting device includes at least one of a horn, a light, an exterior display, an alarm, and a speaker.

4. The exterior alerting system of claim 1, wherein the controller is further configured to determine that the object is a pedestrian; and broadcast an emergency message to devices connected to a digital network.

5. The exterior alerting system of claim 1, wherein the controller is further configured to determine that the object is a second vehicle; and communicate with a control system of the second vehicle.

6. The exterior alerting system of claim 1, wherein the controller is further configured to determine if the vehicle can avoid the calculated danger zone based on a distance between the vehicle and the object, a vehicle velocity, and an object velocity.

7. The exterior alerting system of claim 1, wherein the alert is repeated at a greater intensity as distance between the vehicle and the object decreases.

8. The exterior alerting system of claim 1, wherein the alert is repeated at a higher frequency as distance between the vehicle and the object decreases.

9. A method for generating exterior alerting signals from a vehicle, comprising steps of:
receiving a position of an object exterior to the vehicle from a sensor;
calculating a danger zone based on a trajectory of the vehicle and the position of the object wherein the danger zone is determined as an area within a threshold distance from the position of the object;
calculating a potential vehicle trajectory different from the trajectory of the vehicle, the potential vehicle trajectory including a potential vehicle velocity vector;

calculating a potential danger zone different from the danger zone based on a trajectory of the object;

in the event that the potential vehicle trajectory intersects with the potential danger zone:
- calculating a potential object velocity vector, wherein the potential object velocity vector is opposite the potential vehicle velocity vector,
- generating at least one exterior alerting signal when the vehicle cannot avoid the danger zone, and
- modifying the trajectory of the vehicle to be the potential vehicle trajectory; and providing an alert to the object based on the exterior alerting signal.

10. The method of claim 9, further comprising:
determining that the object is a pedestrian; and
broadcasting an emergency message to devices connected to a digital network.

11. The method of claim 9, further comprising:
determining that the object is a second vehicle; and
communicating with a control system of the second vehicle.

12. The method of claim 9, further comprising:
determining if the vehicle can avoid the calculated danger zone based on a distance between the vehicle and the object, a vehicle velocity, and an object velocity.

13. The method of claim 9, further comprising:
repeating the alert at a greater intensity or a higher frequency as distance between the vehicle and the object decreases.

14. A non-transitory computer-readable storage medium storing a computer program which, when executed by at least one processor, causes the at least one processor to perform a method for generating exterior alerting signals from a vehicle, the method comprising:

receiving a position of an object exterior to the vehicle from a sensor;

calculating a danger zone based on a trajectory of the vehicle and the position of the object wherein the danger zone is determined as an area within a threshold distance from the position of the object;

calculating a potential vehicle trajectory different from the trajectory of the vehicle, the potential vehicle trajectory including a potential vehicle velocity vector;

calculating a potential danger zone different from the danger zone based on a trajectory of the object in the event that the potential vehicle trajectory intersects with the potential danger zone:
- calculating a potential object velocity vector, wherein the potential object velocity vector is opposite the potential vehicle velocity vector,
- generating at least one exterior alerting signal when the vehicle cannot avoid the danger zone, and
- modifying the trajectory of the vehicle to be the potential vehicle trajectory; and providing an alert to the object based on the exterior alerting signal.

* * * * *